United States Patent
Efe et al.

(10) Patent No.: US 11,063,656 B2
(45) Date of Patent: Jul. 13, 2021

(54) N-WAY POLARIZATION DIVERSITY FOR WIRELESS ACCESS NETWORKS

(71) Applicant: Starry, Inc., Boston, MA (US)

(72) Inventors: Volkan Efe, Belmont, MA (US); Joseph Thaddeus Lipowski, Norwell, MA (US)

(73) Assignee: Starry, Inc., Boston, MA (US)

( * ) Notice: Subject to any disclaimer, the term of this patent is extended or adjusted under 35 U.S.C. 154(b) by 0 days.

(21) Appl. No.: 15/989,241

(22) Filed: May 25, 2018

(65) Prior Publication Data

US 2018/0343049 A1 Nov. 29, 2018

Related U.S. Application Data

(60) Provisional application No. 62/511,513, filed on May 26, 2017.

(51) Int. Cl.
| | |
|---|---|
| *H04B 7/10* | (2017.01) |
| *H04B 7/0452* | (2017.01) |
| *H01Q 19/13* | (2006.01) |
| *H01P 1/161* | (2006.01) |
| *H01Q 25/00* | (2006.01) |
| *H01Q 15/06* | (2006.01) |
| *H01Q 13/10* | (2006.01) |
| *H04W 84/12* | (2009.01) |
| *H01Q 15/24* | (2006.01) |
| *H01Q 13/02* | (2006.01) |

(52) U.S. Cl.
CPC .............. *H04B 7/10* (2013.01); *H01P 1/161* (2013.01); *H01Q 19/136* (2013.01); *H01Q 25/00* (2013.01); *H04B 7/0452* (2013.01); *H01Q 13/0258* (2013.01); *H01Q 13/10* (2013.01); *H01Q 15/06* (2013.01); *H01Q 15/242* (2013.01); *H04W 84/12* (2013.01)

(58) Field of Classification Search
USPC ........................................................ 375/267
See application file for complete search history.

(56) References Cited

U.S. PATENT DOCUMENTS

| | | | | | |
|---|---|---|---|---|---|
| 5,815,121 | A | * | 9/1998 | Collier ................... | H01Q 21/00 343/756 |
| 6,204,810 | B1 | * | 3/2001 | Smith ..................... | H04B 7/10 342/361 |
| 7,372,911 | B1 | * | 5/2008 | Lindskog ............. | H04B 7/0617 375/267 |
| 2002/0109558 | A1 | * | 8/2002 | Kanamaluru ........... | H01P 1/161 333/21 A |
| 2006/0264210 | A1 | * | 11/2006 | Lovberg ................ | H04W 92/20 455/422.1 |
| 2015/0236416 | A1 | * | 8/2015 | Fonseca ................... | H01Q 5/30 343/837 |
| 2015/0303589 | A1 | * | 10/2015 | Bi .......................... | H01Q 21/24 343/873 |
| 2015/0326359 | A1 | * | 11/2015 | Subramanian ......... | H04B 7/086 370/330 |

(Continued)

*Primary Examiner* — Lihong Yu

(74) *Attorney, Agent, or Firm* — HoustonHogle LLP

(57) ABSTRACT

A wireless node described herein transmits and receives high frequency signals with three or more different polarizations simultaneously thereby increasing network capacity. The different polarizations can be achieved by using polarizer sheets and/or orthomode transducer assemblies or Cassegrain antennas with multiple subreflectors.

22 Claims, 15 Drawing Sheets

(56) References Cited

U.S. PATENT DOCUMENTS

| | | | |
|---|---|---|---|
| 2016/0191129 A1* | 6/2016 | Noh | H04B 7/10 |
| | | | 375/267 |
| 2016/0345286 A1* | 11/2016 | Jamieson | G01S 3/023 |
| 2017/0125914 A1* | 5/2017 | Liou | H01Q 19/17 |
| 2017/0215089 A1 | 7/2017 | Lipowski et al. | |

* cited by examiner

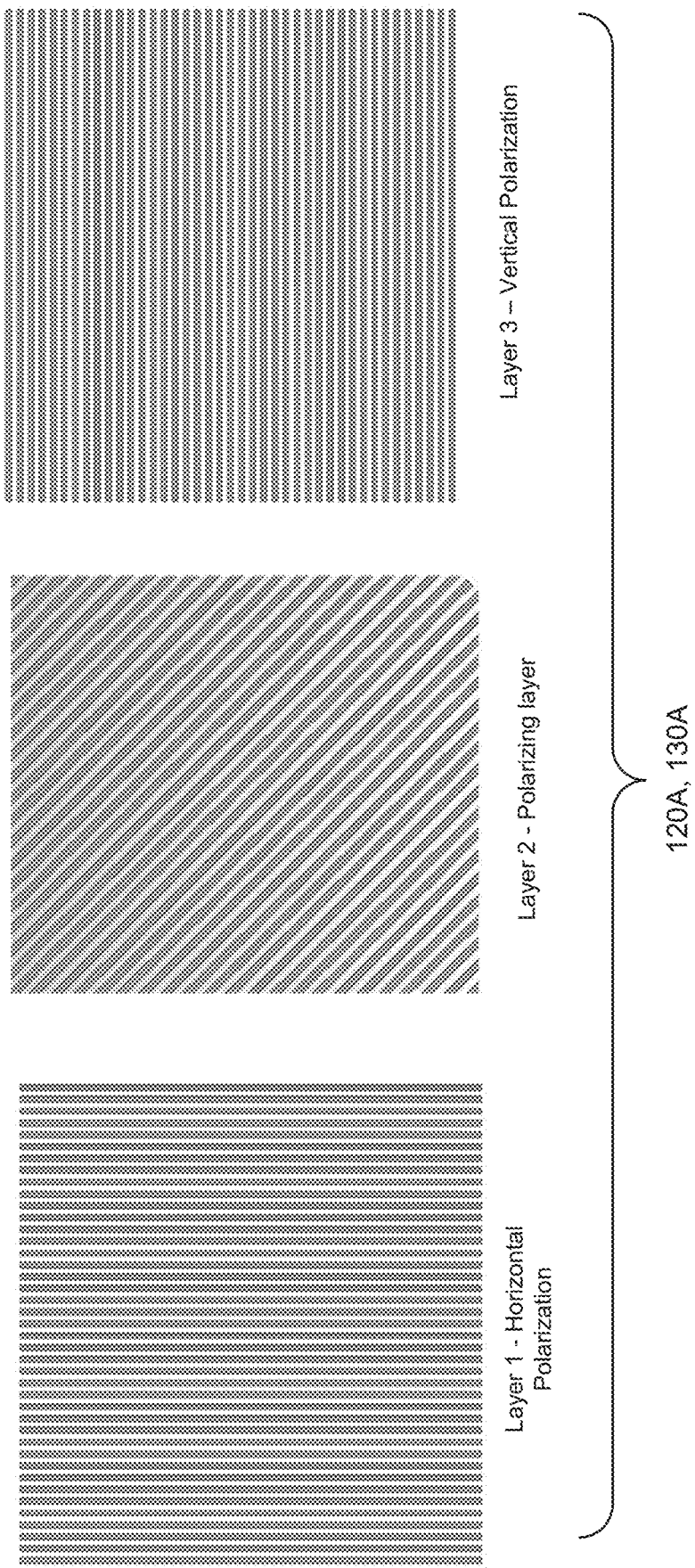

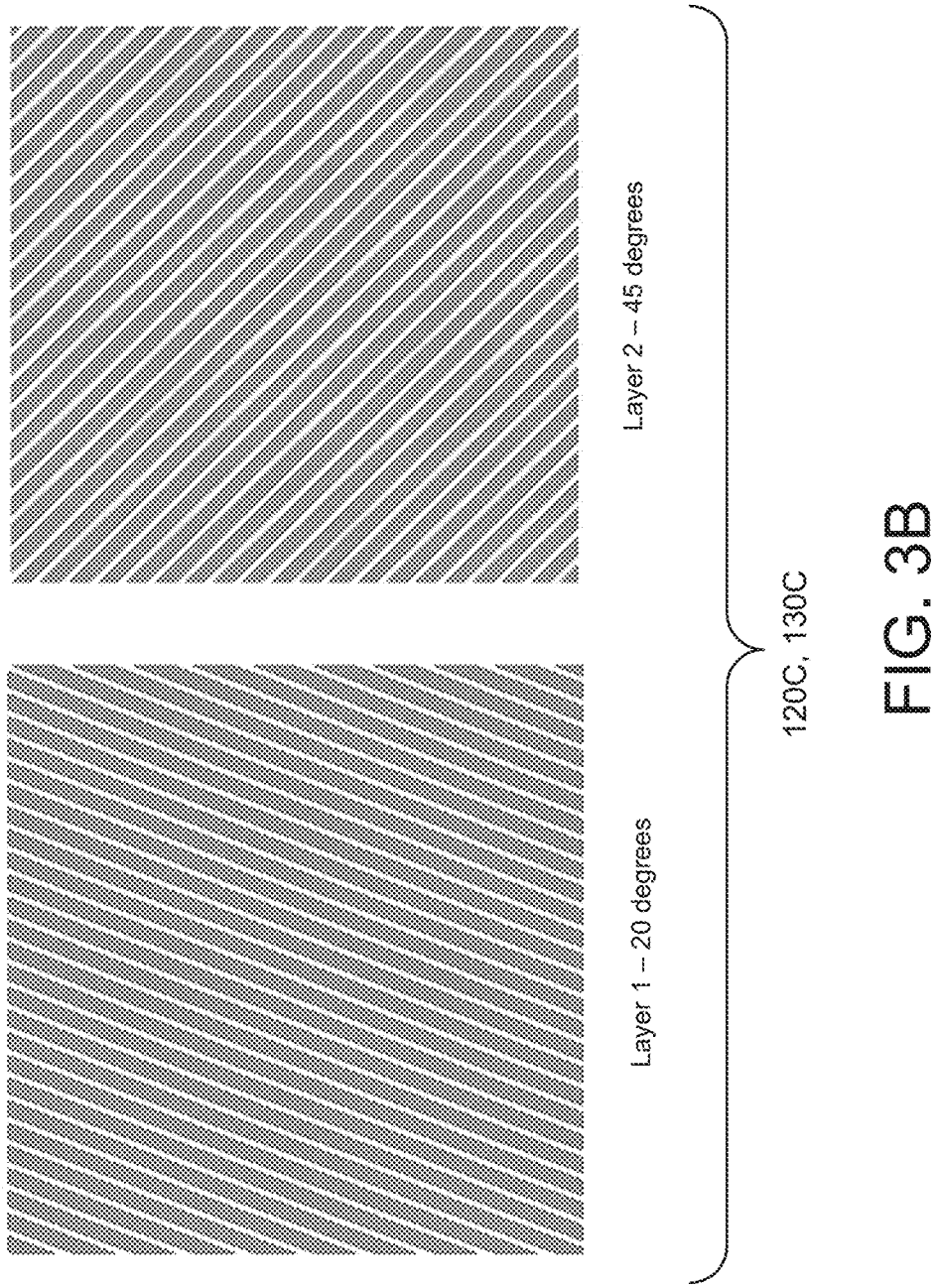

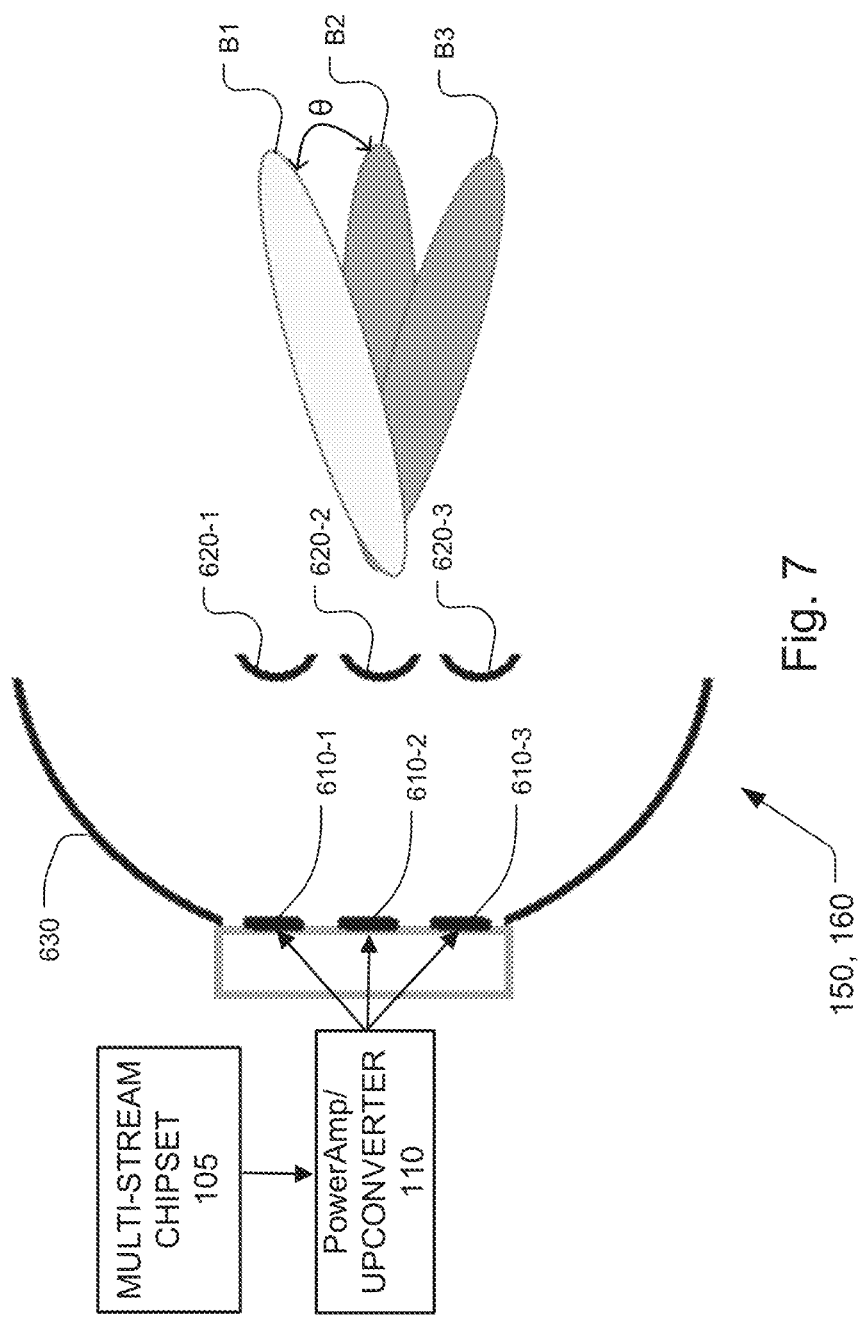

N-WAY POLARIZATION DIVERSITY FOR WIRELESS ACCESS NETWORKS

RELATED APPLICATIONS

This application claims the benefit under 35 USC 119(e) of U.S. Provisional Application No. 62/511,513 filed on May 26, 2017, which is incorporated herein by reference in its entirety.

BACKGROUND OF THE INVENTION

Internet service providers (ISPs) have historically used a number of different technologies (e.g., ISDN, DSL, cable, optical fiber, etc.) in their access networks to deliver network connectivity to subscriber's premises such as homes, multidwelling units, and businesses. Fixed wireless network access is also used in some areas. ISPs providing the wireless network access can transmit and receive data to and from endpoint/subscriber nodes usually at the premises as radio waves via transmission towers.

Orthogonal polarizations have been commonly used while transmitting and receiving data in wireless networks. This is because orthogonal polarizations (i.e., two 90 degree apart polarizations) are uncorrelated when transmitted and in a Line of Sight (LOS) environment, remain orthogonal and uncorrelated. For example, an ideal vertically polarized antenna does not capture any horizontally polarized electromagnetic waves. The measure that quantifies the capacity of an antenna to select a certain polarization is defined as antenna cross polarization isolation.

SUMMARY OF THE INVENTION

In some implementations each of the two polarizations is fed with a single spatial stream. Any non-ideality due to polarization rotation can be resolved by multiple-input and multiple-output (MIMO) receiver using simple linear algebraic manipulation of the signal.

In a more realistic operating environment, additional paths can occur that are the result of reflections off other objects, even for ideal antennas. Further, in the case of non-ideal antennas, sidelobes may reflect off a structure with a random polarization. This provides the equivalent of an additional path or paths to the receiving antenna, hence creating additional independent paths, which MIMO spatial streams may be applied over.

By using multiple polarizations for transmission and reception, network capacity can be significantly increased. In certain geographical areas, the benefits of using the multiple polarizations (e.g., enhancement in network capacity and thus speed) can outweigh even suboptimal isolation between the different polarizations. The more polarizations that an antenna system supports, the more channels can be accommodated in a network thereby increasing network capacity.

According to one aspect, the invention features a method for transmitting information via high frequency signals in a wireless access system. The method comprises encoding information as high frequency signals; and transmitting the high frequency signals with at least three different polarizations simultaneously.

In one example, the polarized signals associated with the high frequency signals are generated by rotating horizontally polarized signals to different degrees of polarization, using e.g., polarizer sheets at a transmit antenna array system. In another case, an orthomode transducer assembly is used that provides the polarized signals with the three different polarizations.

The different polarizations might include a vertical polarization, a +45 degrees polarization, and a −45 degrees polarization. Another option includes a vertical polarization, a +60 degrees polarization, and a −60 degrees polarization.

According to another aspect, the invention features a node in a wireless access system. The node comprises a transmit antenna system for transmitting high frequency signals as polarized signals with at least three different polarizations; and a receive antenna system for receiving other polarized signals with the three different polarizations from other nodes.

The node can include a multi spatial stream chipset for encoding information into and decoding information from multi spatial stream signals. It could be n×n MIMO access point WiFi IEEE 802.11ac chipset.

Further, an upconverter is used to upconvert the multi spatial stream signals to the high frequency signals and a downconverter for downconverting the received polarized signals for decoding by the multi spatial stream chipset.

According to yet another aspect, the invention features a wireless node. The node comprises a multi spatial stream chipset for encoding information into and decoding information from multi spatial stream signals; an upconverter for upconverting the multi spatial stream signals to high frequency signals; and a transmit antenna system for transmitting the high frequency signals as polarized signals with three or more different polarizations simultaneously.

According to yet another aspect, the invention features a wireless node that has a multi spatial stream chipset for encoding information into and decoding information from multi spatial stream signals and a Cassegrain antenna system including multiple feed and/or receive antennas for generate beams of different polarizations and tilt angles.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 3A-3C show polarizer sheets used at transmit and receive antenna arrays;

FIG. 7 is a schematic side view showing a transmit antenna system having different streams with different polarizations and beam tilt;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
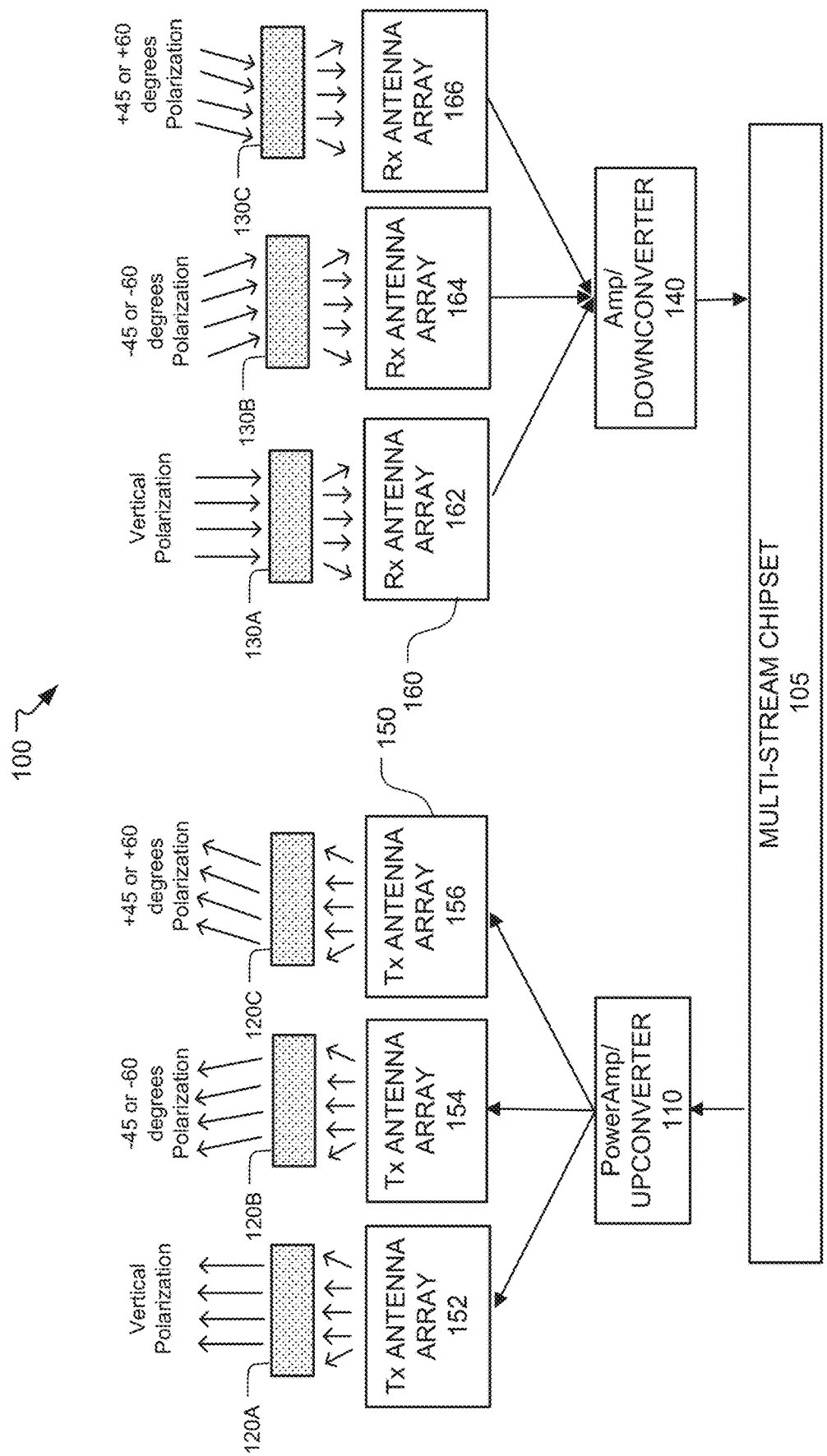
FIGS. 1A-1B are block diagrams showing transmission and reception of different polarized signals using polarizer sheets at wireless nodes.

FIG. 1A illustrates a wireless node 100 capable of transmitting and receiving high frequency signals with three different polarizations in a wireless access system. A transmit antenna system 150 transmits the high frequency signals as polarized signals with the three different polarizations simultaneously. A receive antenna system 160 receives polarized signals with the different polarizations from other nodes in the wireless access system.

The high frequency signals are in the 10 GHz to 300 GHz band for communications between various wireless nodes of the wireless access system. This spectral band encompasses millimeter wavelengths (mm-wave) that are typically described as covering the 30 GHz to 300 GHz frequency band.

In some embodiments, a multi-stream chipset 105 encodes information to be transmitted into multi spatial stream signals. Examples of multi-stream chipsets include access point chipsets implementing the IEEE 802.11 standard and specifically versions of the standard that encompass multiple spatial streams such as the IEEE 802.11ac standard. In one specific embodiment, the chipset is a 3×3 MIMO access point WiFi IEEE 802.11ac chipset.

A power amplifier and upconverter 110 upconverts and then amplifies these multi spatial stream signals to the high frequency signals. The high frequency signals are provided as inputs to three transmit antenna arrays 152, 154, 156 of the transmit antenna system 150. The high frequency signals at the transmit antenna arrays 152, 151, 156 are then transmitted with three different polarizations for diversity. In particular, the high frequency signals at transmit antenna array 152 are converted to polarized signals with a vertical polarization, the high frequency signals at transmit antenna array 154 are converted to polarized signals with a −45 or −60 degrees polarization, and the high frequency signals at transmit antenna array 156 are converted to polarized signals with a +45 or +60 degrees polarization.

Basically, in the current embodiment, the multiple spatial streams produced by the IEEE 802.11ac standard chip set are mapped to different polarizations rather than different spatial streams supported by a multiple input multiple output (MIMO) antenna array.

In some embodiments, each transmit antenna array 152, 154, 156 creates/emits horizontally polarized electromagnetic waves/signals. Polarization diversity s achieved by adding a polarizer sheets 120A, 120B, 120C in front of the transmit antenna arrays 152, 154, 156 to rotate the horizontally polarized signals to vertical polarized signals or any degree of slant polarization, i.e., +45 degrees, +60 degrees etc. In particular, polarizer sheet 120A is placed in front of transmit antenna array 152 to rotate the horizontally polarized signals to vertically polarized signals, polarizer sheet 120B is placed in front of transmit antenna array 154 to rotate the horizontally polarized signals to −45 or −60 degrees polarized signals, and polarizer sheet 120C is placed in front of transmit antenna array 156 to rotate the horizontally polarized signals to +45 or +60 degrees polarized signals. (It should be noted that 45 degree and 60 degree polarizations need two different polarizers. The same physical polarizer cannot support both polarizations.)

On the receive side, polarized signals from other nodes in the wireless access system are converted to horizontally polarized signals by polarizer sheets 130A, 130B, 130C placed in front of the receive antenna arrays 162, 164, 166 of the receive antenna system 160. In particular, vertically polarized signals are converted to horizontally polarized signals by polarizer sheet 130A, −45 or −60 degrees polarized signals are converted to horizontally polarized signals by polarizer sheet 130B, and +45 or +60 degrees polarized signals are converted to horizontally polarized signals by polarizer sheet 130C.

The horizontally polarized signals are received by the receive antenna arrays 162, 164, 166. The signals are fed to an amplifier and downconverter 140 that amplifies and downconverts the signals to multi spatial stream signals that can be decoded by the multi-stream chipset 105.

By supporting multiple polarizations at the transmit/receive antenna systems 150, 160, the network capacity is significantly increased because the number of channels that can be accommodated in the wireless access system is increased.

Moreover, the use of the polarization sheets enables the same antenna design to be reused for each of the polarizations.

Figure 1B:
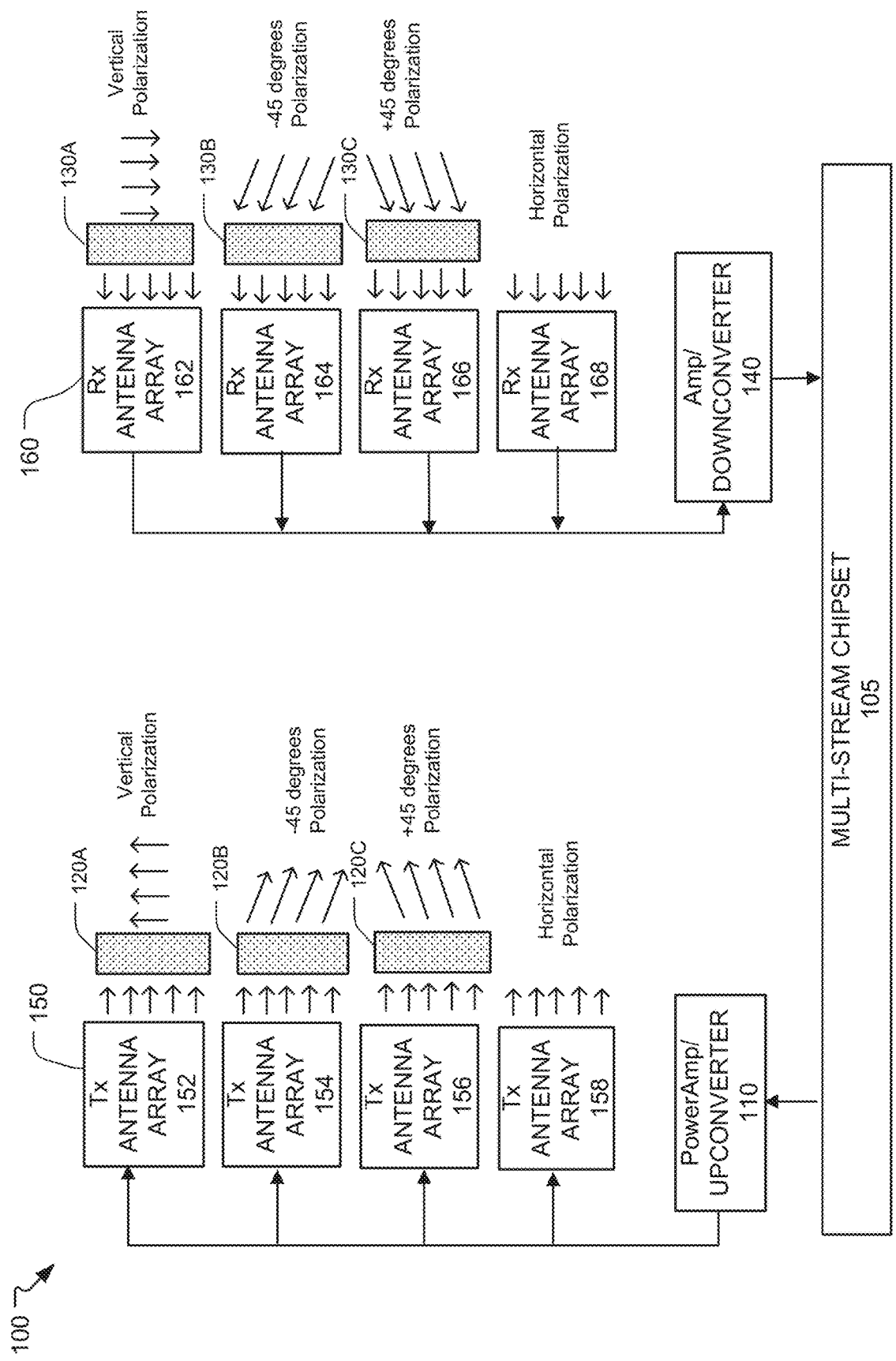

FIG. 1B illustrates an embodiment where the wireless node 100 is capable of transmitting and receiving high frequency signals with four different polarizations simultaneously. Multi spatial stream signals from the multi-stream chipset 105 are upconverted to high frequency signals by the upconverter 110. The chipset 105 is preferably a 4×4 MIMO access point WiFi IEEE 802.11ac chipset. The high frequency signals are fed to transmit antenna arrays 152, 154, 156, 158 of the transmit antenna system 150.

The high frequency signals at the transmit antenna arrays 152, 154, 156, 158 are transmitted as polarized signals with four different polarizations for diversity. In particular, the high frequency signals at transmit antenna array 152 are transmitted as polarized signals with a vertical polarization. This is achieved by placing polarizer sheet 120A in front of the transmit antenna array 152 that rotates the horizontally polarized signals emitted from the transmit antenna array 152 to the vertically polarized signals. The high frequency signals at transmit antenna array 154 are transmitted as polarized signals with a −45 degrees polarization. This is achieved by placing polarizer sheet 120B in front of the transmit antenna array 154 that rotates horizontally polarized signals emitted from the transmit antenna array 154 to −45 degrees polarized signals. The high frequency signals at transmit antenna array 156 are transmitted as polarized signals with a +45 degrees polarization. This is achieved by placing polarizer sheet 120C in front of the transmit antenna array 156 that rotates horizontally polarized signals emitted from transmit antenna array 156 to +45 degrees polarized signals. The high frequency signals at transmit antenna array 158 are transmitted as horizontally polarized signals (i.e., without requiring the placement of polarizer sheets).

On the receive side, polarized signals from other nodes are converted to horizontally polarized signals by polarizer sheets 130A, 130B, 130C placed in front of the receive antenna arrays 162, 164, 166 of the receive antenna system 150. In particular, vertically polarized signals are converted to horizontally polarized signals by polarizer sheet 130A, −45 degrees polarized signals are converted to horizontally polarized signals by polarizer sheet 130B, and +45 degrees polarized signals are converted to horizontally polarized signals by polarizer sheet 130C. Horizontally polarized signals from other nodes are received by the receive antenna array 168 of the receive antenna array system 150 without requiring the placement of polarizer sheets.

The horizontally polarized signals are received by the receive antenna arrays 162, 164, 166, 168. The signals are fed to a downconverter 140 that downconverts the signals to multi spatial stream signals that can be decoded by the multi-stream chipset 105.

Examples of the wireless node of FIG. 1A and FIG. 1B can include an aggregation node or an endpoint/subscriber node described in detail in U.S. application Ser. No. 15/418,256 filed on Jan. 27, 2017, entitled "Star Topology Fixed Wireless Access Network", now U.S. Pat. Appl. Pub. No. US 2017/0215089, which is incorporated herein by reference in its entirety. In these embodiments, the polarizer sheets described herein can be placed in front of transmit/receive phased array antennas. In alternate embodiments, the OMT assemblies with the transmit/receive antenna systems described herein can be used on subscriber side antennas associated with the endpoint/subscriber node. In these embodiments, the subscriber side antenna systems do not include phased antenna arrays and/or Rotman lens.

Figure 2A:
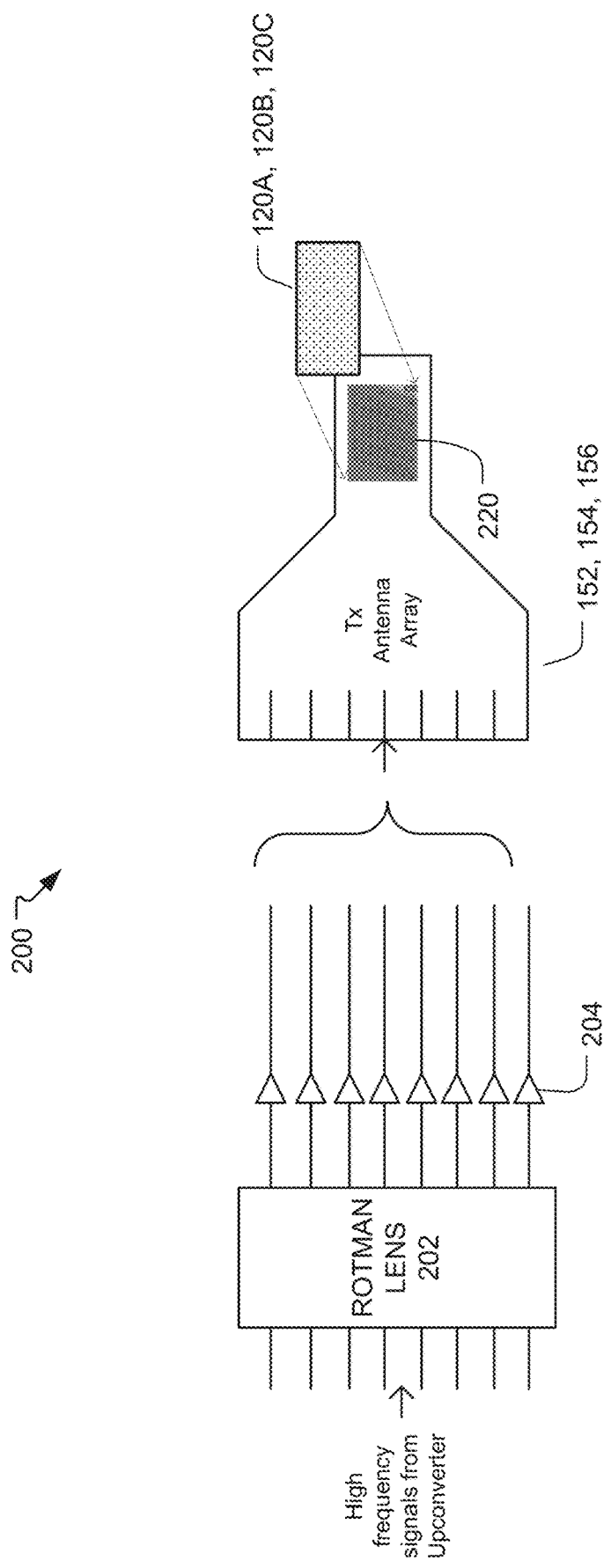
FIGS. 2A-2B are schematic, partially exploded, diagrams for polarized signal transmission at transmit and receive antenna arrays.

FIG. 2A is a schematic diagram 200 for polarized signal transmission at a particular transmit antenna array 152, 154, 156 of the transmit antenna array system 150 depicted in FIGS. 1A and 1B.

In some embodiments, the transmit antenna array system 150 includes a phase control device, such as Rotman lens 202, and a set of power amplifiers 204 for each of the transmit antenna arrays 152, 154, 156, 158. High frequency signals (i.e., upconverted signals) from the upconverter 110 are fed into multiple input ports of the Rotman lens 202. The Rotman lens 202 controls phases of the signals to be fed to the set of amplifiers 204 and the transmit antenna arrays 152, 154, 156, 158. The set of power amplifiers 204 are provided at output ports of the Rotman lens 202. The amplified signals from the power amplifiers 204 are fed into the input ports of transmit antenna arrays 152, 154, 156, 158.

In some embodiments, the transmit antenna arrays 152, 154, 156, 158 are slotted waveguide antenna arrays with antenna slots 220 that are half wavelength long openings across the waveguide channel to emit horizontally polarized electromagnetic waves/signals.

The polarizer sheets 120A, 120B, 120C are placed in front of respective antenna slots 220 of transmit antenna arrays 152, 154, 156 to rotate the horizontally polarized signals to different degrees of slant polarization.

Figure 2B:
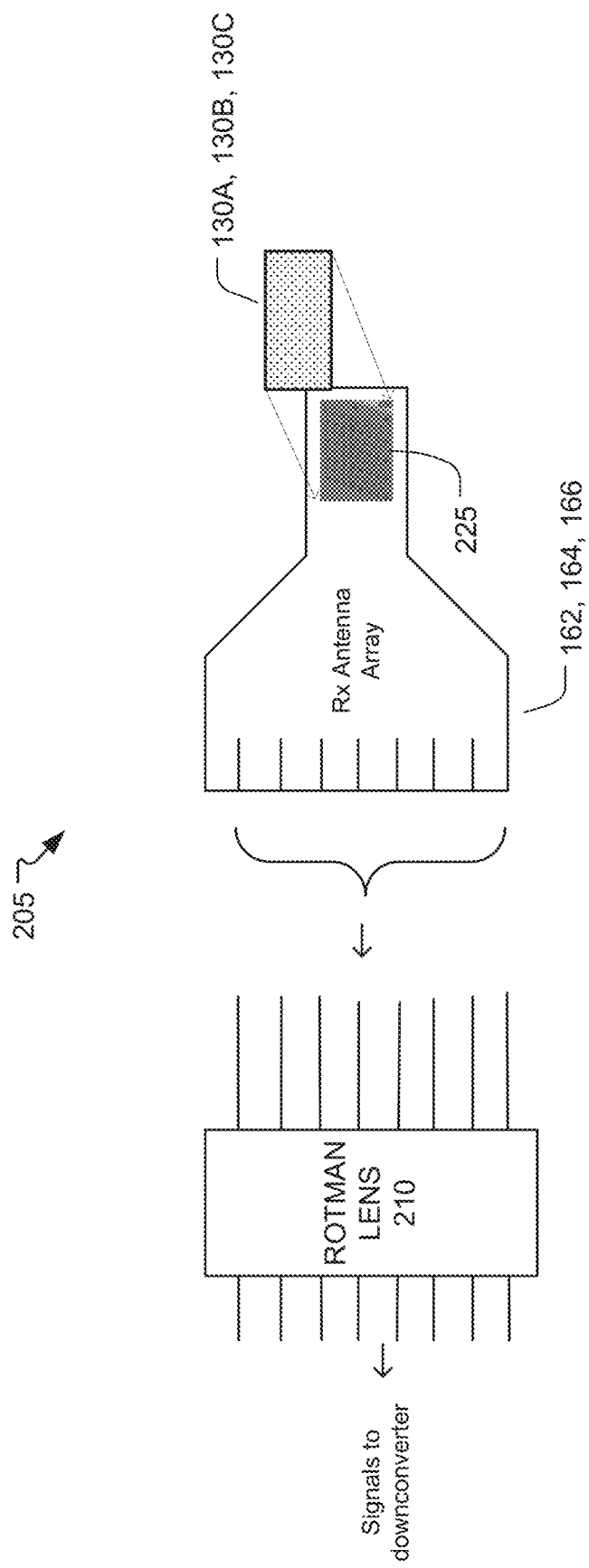

FIG. 2B is a schematic diagram 205 for polarized signal reception at a particular receive antenna array 162, 164, 166 of the receive antenna array system 160 depicted in FIGS. 1A and 1B.

In some embodiments, the receive antenna array system 160 includes Rotman lens 210 for each of the receive antenna arrays 162, 164, 166, 168. The output ports of the receive antenna arrays 162, 164, 168 teed into input ports of the respective Rotman lens 210. The Rotman lens 210 receives high frequency signals at the input ports and controls the phases of the received signals to produce outputs to the downconverter 140.

In some embodiments, the receive antenna arrays 162, 164, 166, 168 are also slotted waveguide antenna arrays with antenna slots 225 that are half wavelength long opening across the waveguide channel to accept horizontally polarized signals.

The polarizer sheets 130A, 130B, 130C are placed in front of respective antenna slots 225 of transmit antenna arrays 162, 164, 166 to rotate the polarized signals received with different degrees of polarization to horizontally polarized signals for reception at the antenna slots 225.

Figure 3C:
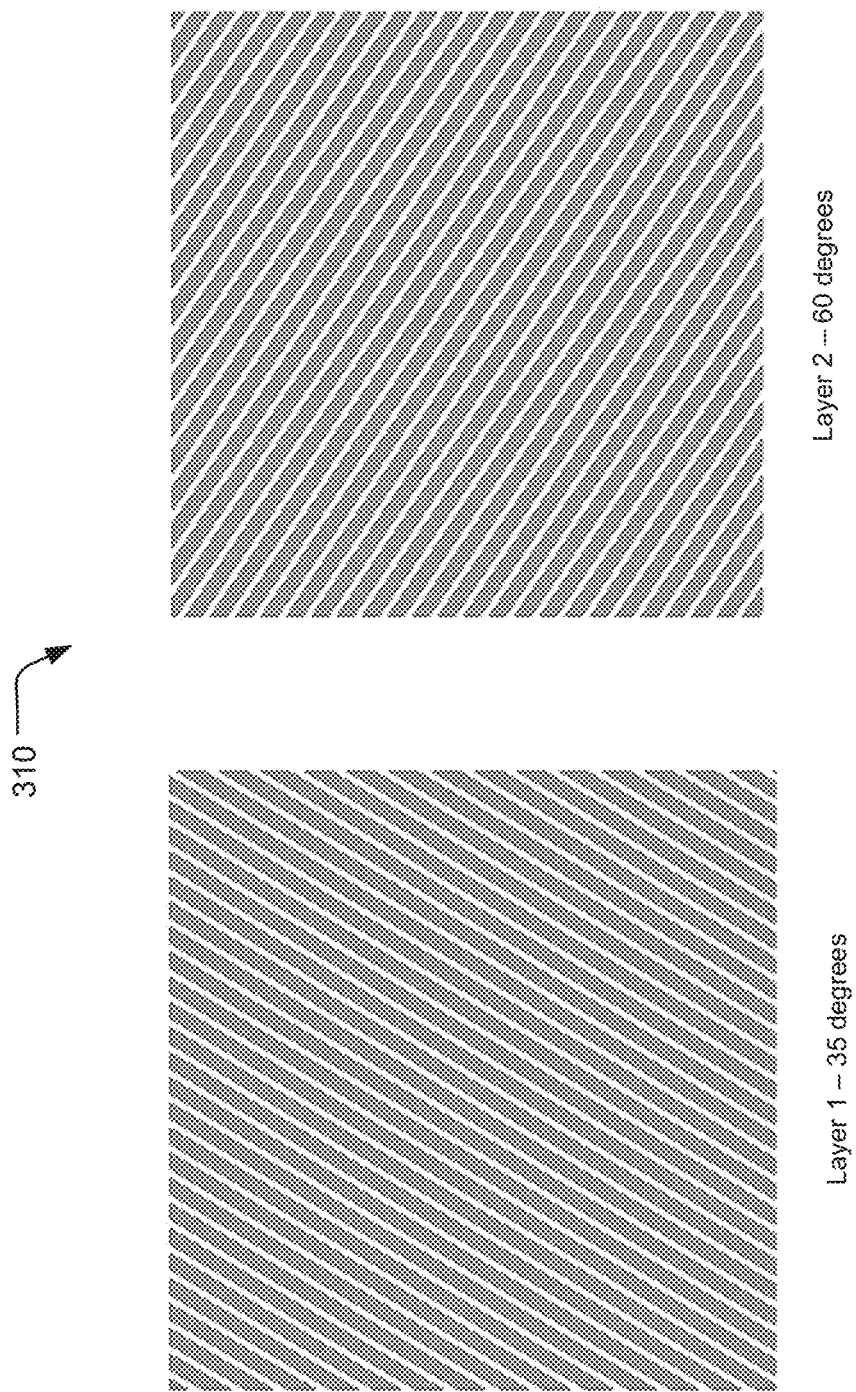

FIGS. 3A-3C depict exemplary polarizer sheets used at transmit and receive antenna array systems 150, 160. Polarizer sheets are designed as multilayer printed circuit hoards (PCBs) that rotate an incident wave at a known polarization to another polarization of interest.

FIG. 3A depicts a polarizer sheet 120A, 130A that rotates horizontally polarized signals to vertically polarized signals and vice versa. The polarizer sheet 120A, 130A is a 3-layer PCB fabricated by bonding 2 Taconic 20 mil thick EZ-IO boards. For example, this 3-layer PCB is placed in front of transmit/receive antenna array 152, 162 of FIG. 1B.

FIG. 3B depicts a polarizer sheet 120C, 130C that rotates horizontally polarized signals to +45 degrees polarized signals and vice versa. The polarizer sheet 120C, 130C is a 2-layer PCB, where the first layer provides 20 degrees polarization and the second layer provides 45 degrees polarization. For example, this 2-layer PCB is placed in front of transmit/receive antenna array 156, 166 of FIG. 1B.

FIG. 3C depicts a polarizer sheet 310 that rotates horizontally polarized signals to 60 degrees polarized signals and vice versa. The polarizer sheet 310 is a 2-layer PCB, where the first layer provides 35 degrees polarization and the second layer provides 60 degrees polarization. It will be appreciated that the polarizer sheets depicted in FIGS. 3A-3C are exemplary and other polarizer sheets providing different degrees of polarizations can be designed and implemented in the wireless access system without departing from the scope of this disclosure.

Figure 4:
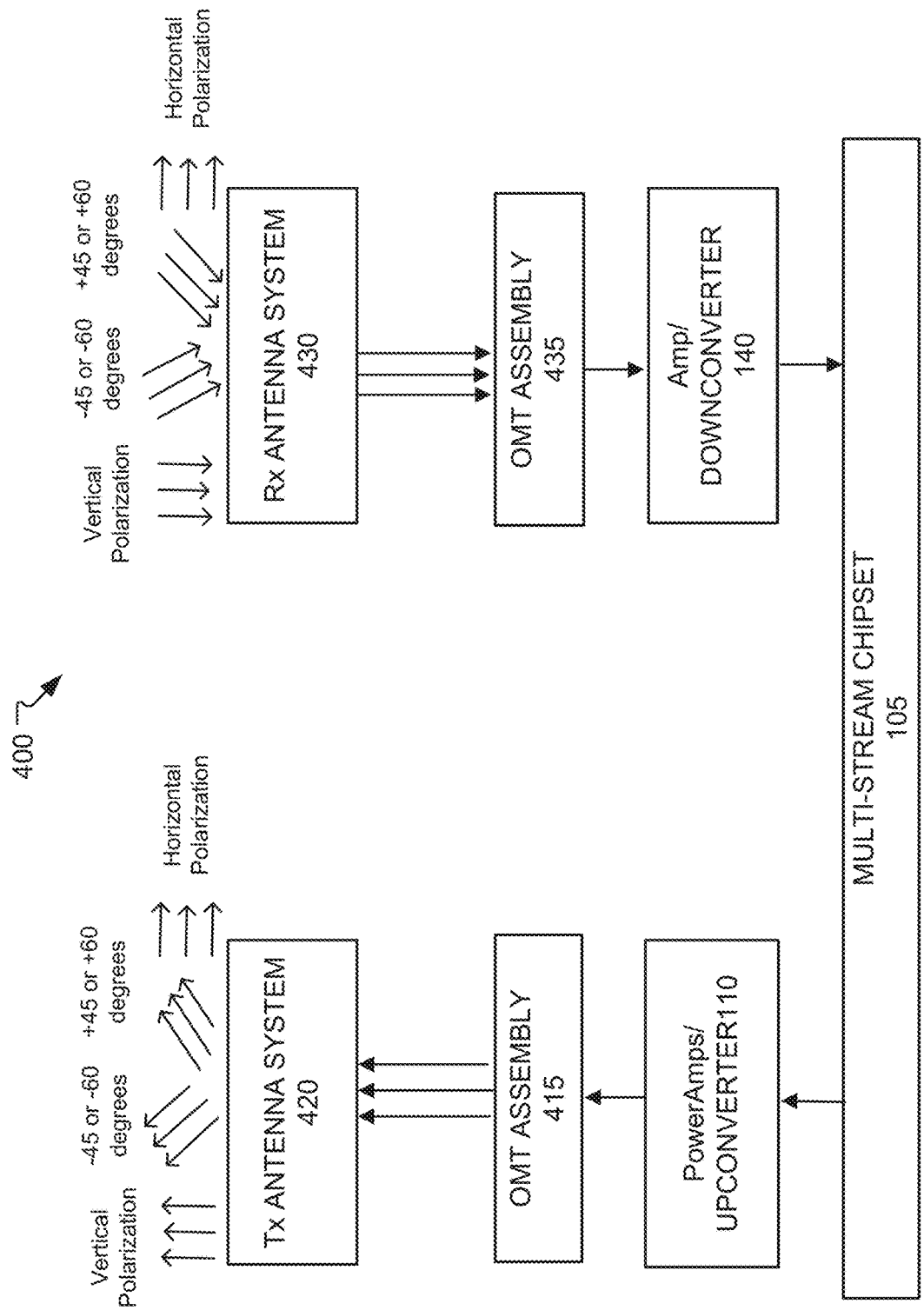
FIG. 4 is a block diagram showing transmission and reception of different polarized signals using orthomode transducer assemblies at wireless nodes.

FIG. 4 illustrates a wireless node 400 capable of transmitting and receiving high frequency signals with different polarizations simultaneously using orthomode transducer (GMT) assemblies. Multiple polarizations can be provided simultaneously via an OMT assembly when used as a feed for a reflector antenna (e.g., Cassegrain reflector antenna).

On the transmit side, multi stream spatial signals from the multi-stream chipset 105 are upconverted to high frequency signals at the upconverter 110. The high frequency signals are fed into the OMT assembly 415. OMT assembly 415 comprises a 2-way, 3-way, or 4-way OMT waveguide device that simultaneously feeds polarized high frequency signals with two, three, or four different polarizations simultaneously to the transmit antenna system 420. The two different polarizations can include vertical and horizontal polarizations. The three different polarizations can include, vertical, +60 degrees, −60 degrees polarizations and/or vertical, +45 degrees, −45 degrees polarizations. The four different polarizations can include vertical, horizontal, +45 degrees, and −45 degrees polarizations. In some implementations, the transmit antenna system 420 includes a transmit reflector antenna that transmits the polarized signals.

On the receive side, polarized signals from other nodes are received at the receive antenna system 430. In some implementations, the receive antenna system 430 includes a receive reflector antenna that simultaneously provides the received polarized signals with the two, three, or four different polarizations to OMT assembly 435. The OMT assembly 435 feeds the signals into downconverter 140. The downconverter 140 downconverts the signals to multi spatial stream signals that can be decoded by the multi-stream chipset 105, which is preferably a 4×4 MIMO access point WiFi IEEE 802.11ac chipset.

Figure 5A:
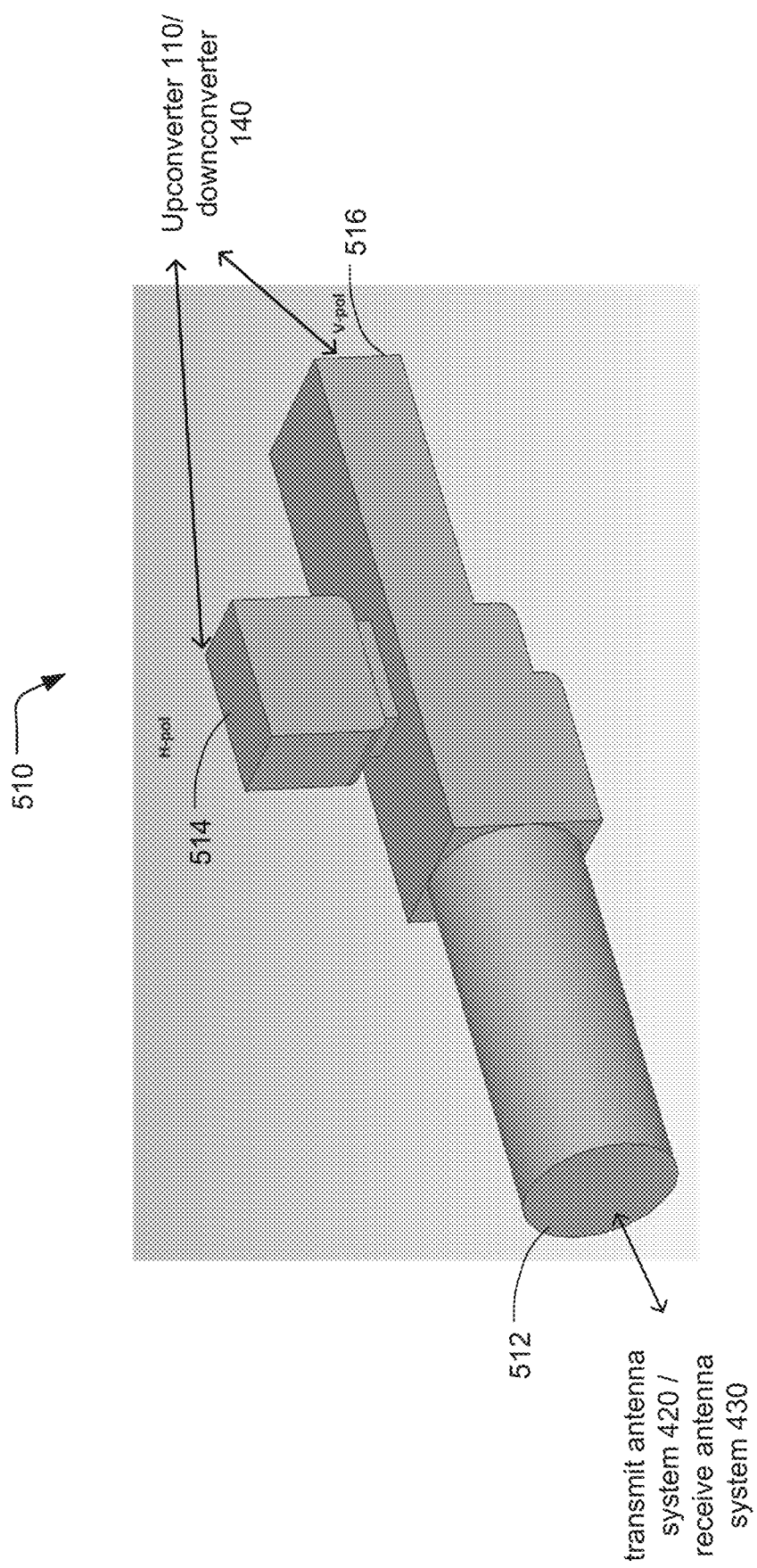
FIGS. 5A-5D are perspective views showing exemplary orthomode transducer devices used for feeding or separating different polarized signals.

FIG. 5A depicts a 2-way OMT waveguide device 510 that can be included in the OMT assemblies 415, 435.

As part of the OMT assembly 415, the OMT waveguide device 510 receives signals with different polarizations from the upconverter via separate waveguides. The separate signals are combined and fed polarized signals with two different polarizations (i.e., horizontal and vertical) to the transmit antenna system 420 via circular aperture 512.

As part of the OMT assembly 435, the OMT waveguide device 510 receives the polarized signals with the two different polarizations from the receive antenna system 430 via the circular aperture 512. The OMT splits the signals by their polarizations. The rectangular ports 514 and 516 are coupled to downconverter 140.

Figure 5B:
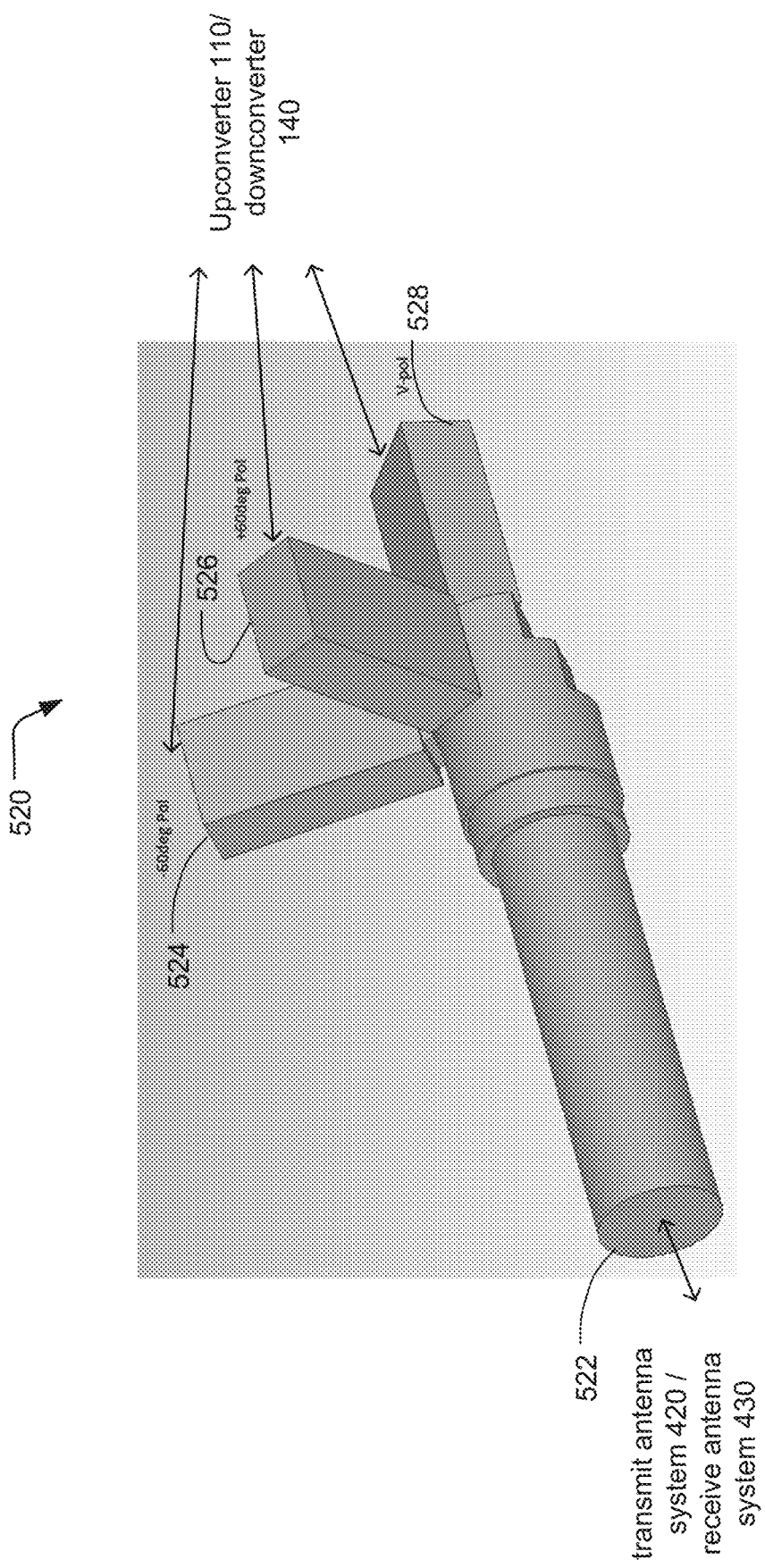

FIG. 5B depicts a 3-way OMT waveguide device 520 that can be included in the OMT assemblies 415, 435. As part of the OMT assembly 415, the OMT waveguide device 520 simultaneously feeds polarized signals with three different polarizations (i.e., vertical, +60 degrees, and −60 degrees) to the transmit antenna system 420 via circular aperture 522. The signals are separately received on via different waveguides from the upconverter 110.

As part of the OMT assembly 435, the OMT waveguide device 520 receives the polarized signals with the three different polarizations from the receive antenna system 430 via the circular aperture 522. The rectangular ports 524, 526, and 528 are coupled to the downconverter 140 which receives the polarizations on separate waveguides.

Figure 5C:
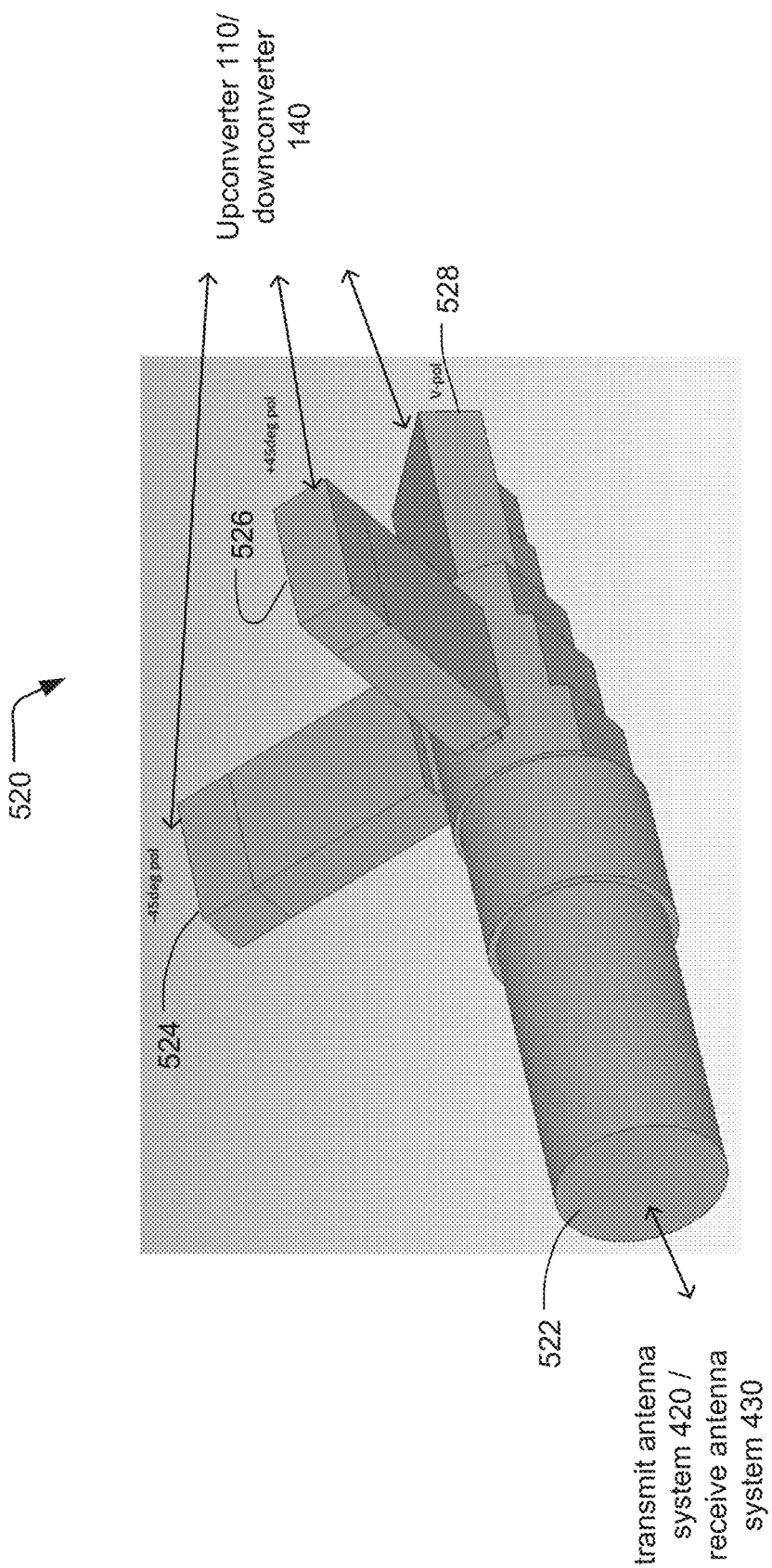

FIG. 5C depicts another example of the 3-way OMT waveguide device 520 that feeds/receives polarized signals with three different polarizations (i.e., vertical, +45 degrees, and −45 degrees).

Figure 5D:
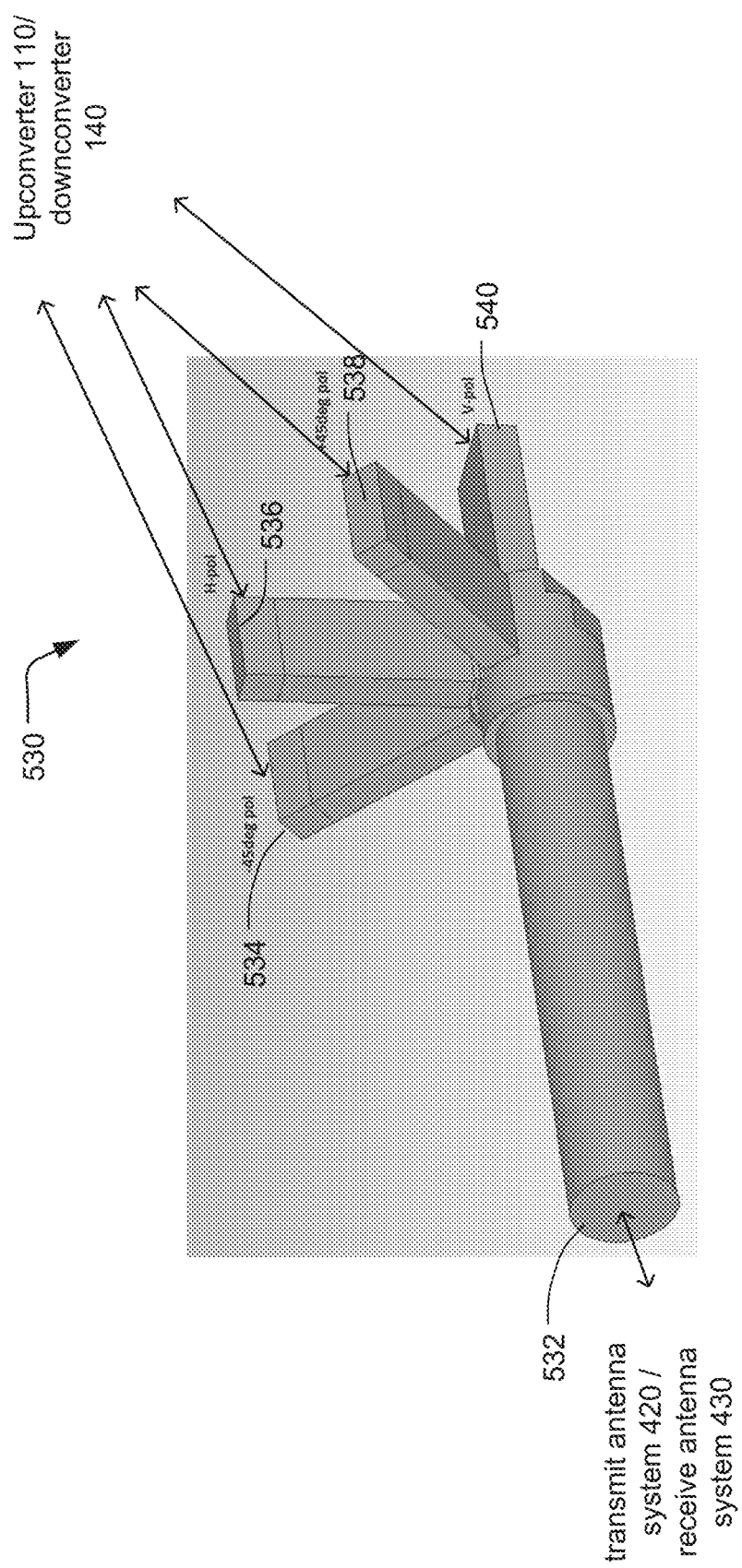

FIG. 5D depicts a 4-way OMT waveguide device 530 that can be included in the OMT assemblies 415, 435. As part of the OMT assembly 415, the OMT waveguide device 530 simultaneously feeds polarized signals with four different polarizations (i.e., vertical, +45 degrees, −45 degrees, and horizontal) to the transmit antenna system 420 via circular aperture 532.

As part of the OMT assembly 435, the OMT waveguide device 530 receives the polarized signals with the four different polarizations from the receive antenna system 430 via the circular aperture 532. The rectangular ports 534, 536, 538, and 540 are coupled to the downconverter 140.

Figure 6:
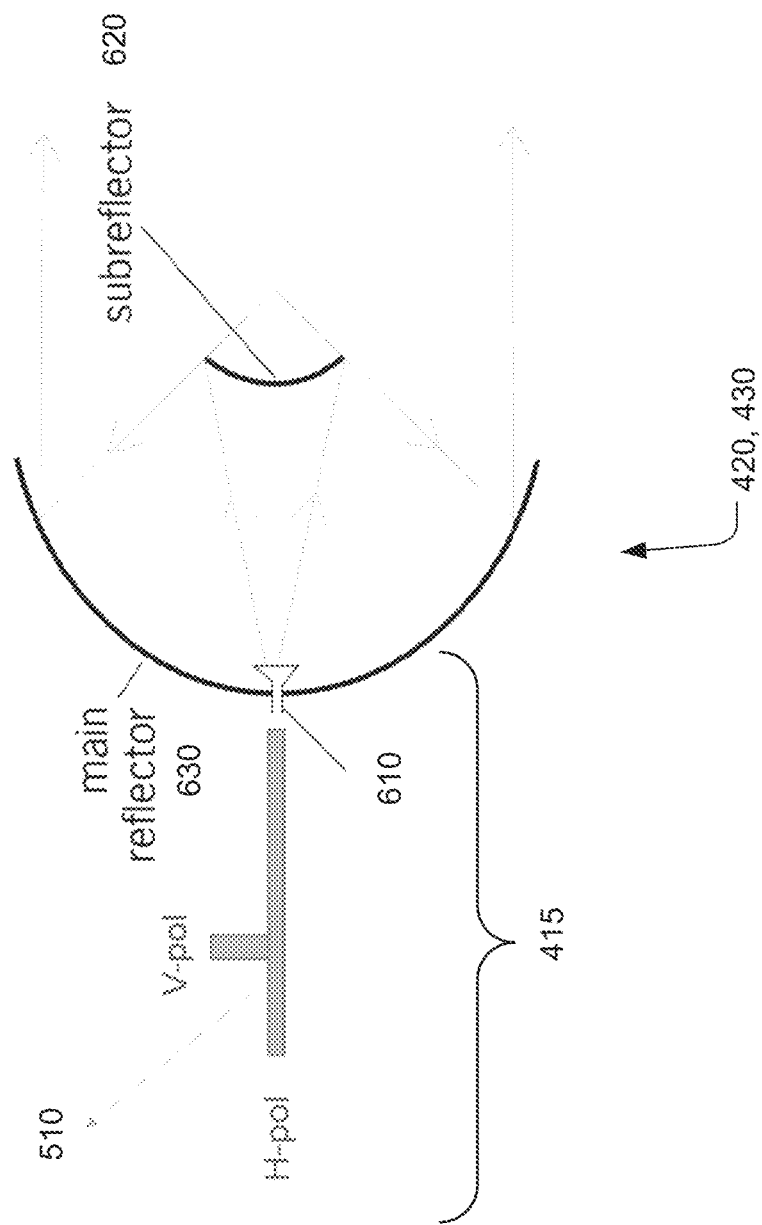
FIG. 6 is a schematic side view showing an orthomode transducer assembly coupled to a transmit antenna system.

FIG. 6 is a schematic side view showing an exemplary OMT assembly 415 and transmit antenna system 420. However, the same architecture is valid for the receive antenna system 430. The OMT assembly 415 includes the 2-way OMT waveguide device 510 (as shown in FIG. 5A) and horn feed 610. The horn feed 610 is the circular waveguide aperture 512 of the OMT waveguide device 510 which carries all polarizations (i.e., horizontal and vertical) simultaneously. As mentioned above with respect to FIG. 5A, the rectangular ports of the OMT waveguide device 510 are connected to the upconverter 110 (or downconverter 140 in the case of the receive antenna system 430).

The polarized signals from the circular waveguide illuminate the subreflector 620 of the transmit antenna system 420 which then illuminates the main reflector 630 of the transmit antenna system 420.

In the case of receiving signals, the polarized signals from the other nodes are received at and illuminate the main reflector 630 which then illuminates the subreflector 620, thereby feeding the received signals into the horn feed 610. It will be understood that while FIG. 6 depicts an OMT assembly with a 2-way OMT waveguide device, OMT assemblies with 3-way or 4-way waveguide devices can be used without departing from the scope of this disclosure.

It will be appreciated, that the polarizer sheets and OMT assemblies described herein are not limited to 2, 3, or 4 polarizations and can be designed to accommodate N different number of polarizations such that each polarization is 360/N degrees apart.

FIG. 7 is a schematic side view showing another embodiment of transmit antenna system 150 to replace the one shown in the embodiment of FIG. 1A.

Here, multiple independent paths are obtained by tilting beam patterns of each polarization emitted from the transmit antenna system 150. This is achieved by using multiple primary feed antennas 610-1, 610-2, 610-3 respectively illuminating multiple subreflectors 620-1, 620-2, 620-3 in a Cassegrain reflector antenna configuration. The feed antennas are fed by a power amplifier and upconverter 110 that receives three streams from is preferably a 3×3 MIMO access point WiFi IEEE 802.11ac chipset.

The radiation is reflected by each of the subreflectors 620-1, 620-2, 620-3 to a single main reflector 630. The different positions of the primary feed antenna-subreflector pairs with respect to the main reflector 630 create a directive beam pattern in the far field associated with each primary feed antenna-subreflector pair.

In one embodiment, one of the subreflectors 620-2 is concentric with the main reflector 630. The resulting beam is straight and in line with the reflector axis of the main reflector 630.

On the other hand, each of subreflectors 620-1 and 620-3 are off-axis. This tilts their beams as the subreflector are located further laterally from the focal point. Beam tilt angle is adjusted by the subreflector position with respect to the focal point of the main reflector 630.

In the preferred embodiment, each of the primary feed antennas 610-1, 610-2, 610-3 generate radiation with a different polarization, such as 0 degrees, 120 degrees, and 240 degrees, respectively. By doing that, three tilted beams B1, B2, B3 are produced, each radiating at desired angle θ and each with a polarization dictated by the polarization of the primary feed antenna illuminating the subreflector. In a receiver, the corresponding receive antenna array 160 replaces the feed antennas with receive antennas, that provide the detected streams to a downconverter and amplifier.

Figure 8A:
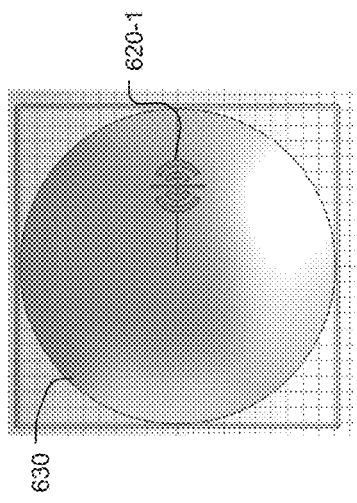
FIGS. 8A and 8B are front plan views showing two positions for the subreflectors relative to the main reflector.
Figure 8B:
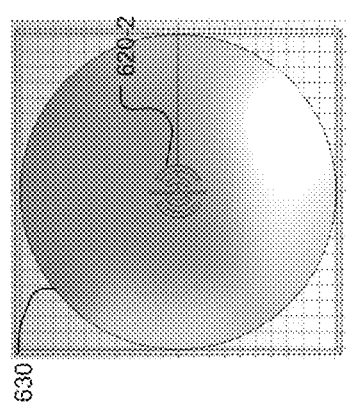

FIGS. 8A and 8B show two positions for the subreflectors 620 relative to the main reflector 630.

In more detail, as shown in FIG. 8A, one of the sub reflectors 620-2 is located at the center of the main reflector 630, along the axis of the main reflector.

Another one of the sub reflectors 620-1 is located off access to the main reflector 630.

Figure 9:
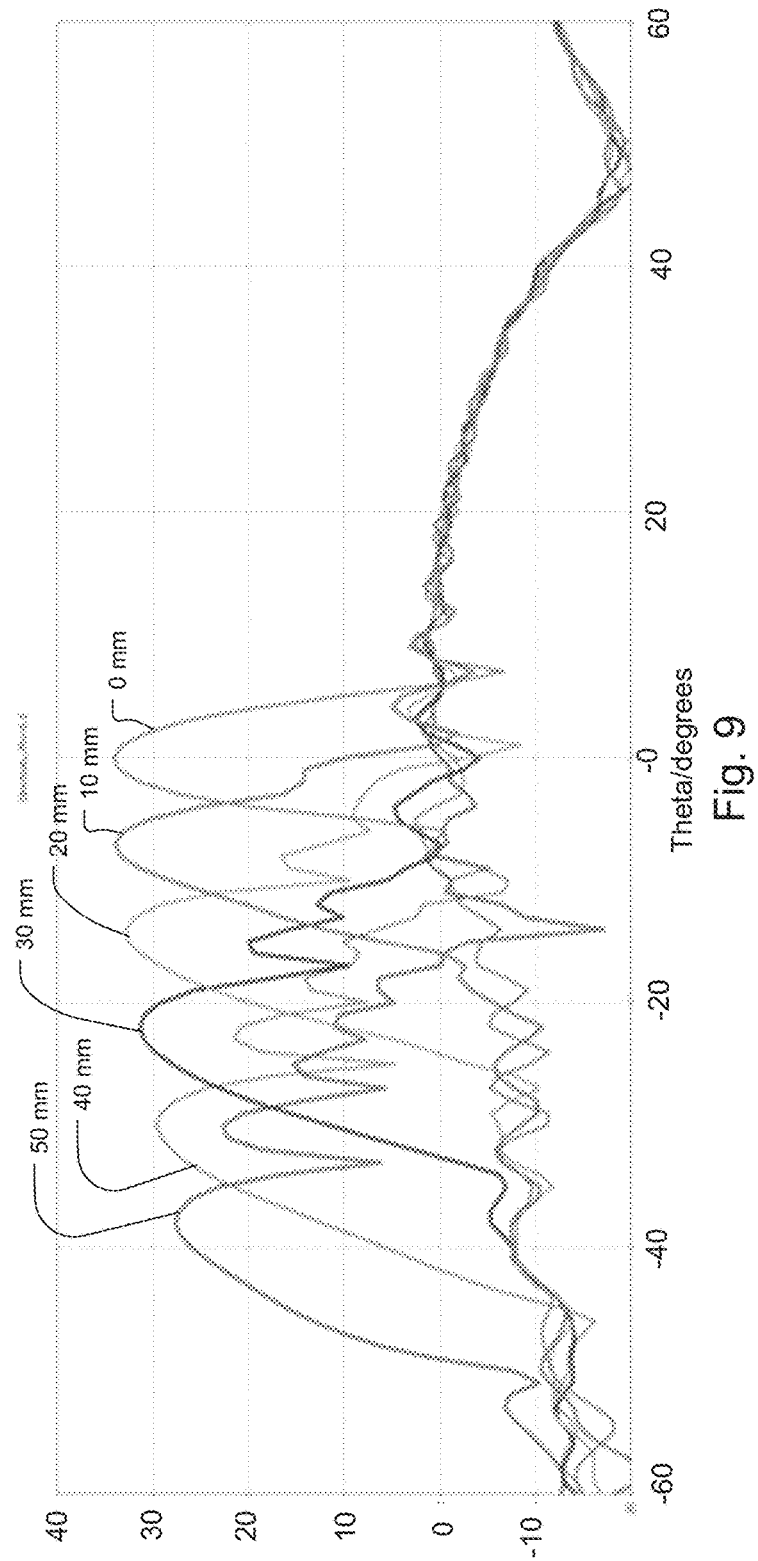
FIG. 9 is a plot of gain as a function of beam tilt in degrees for different subreflector positions away from the center axis of the main reflector.

FIG. 9 is a plot of gain as a function of beam tilt (angle θ) in degrees. In more detail, the gain profiles for several sub reflector positions (measured in millimeters from the center axis of the main reflector) is shown. The plot shows that as a subreflectors are moved away from the central axis, the beam tilt θ changes is between 0 degrees and about 40 degrees, with only a small impact on gain.

In some embodiments, the multi-stream chipset 105 described herein can include one or more WiFi chipsets that are capable of maintaining multiple spatial streams such as provided by the IEEE 802.11n or 802.11ac versions and follow-on versions of the IEEE 802.11 standard. The Win chipsets can produce multi spatial stream WiFi signals, which are signals that have been encoded according to the IEEE 802.11 standard. These WiFi signals are then upconverted to the high frequency signals for transmission. In turn, received high frequency signals can be downconverted to WiFi signals at the conventional frequencies such as 2.4 or 5 GHz.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for transmitting information via high frequency signals in a wireless access system, the method comprising:
    encoding the information in at least three high frequency multi spatial stream signals by upconverting at least three multi spatial stream signals from a multi spatial stream chipset, wherein the multi spatial stream chipset is a WiFi IEEE 802.11 chipset and an upconverter is used to upconvert the multi spatial stream signals to at least three high frequency multi spatial stream signals in a 10 GHz to 300 GHz band; and
    transmitting the at least three high frequency multi spatial stream signals with at least three different polarizations simultaneously.

2. The method of claim 1, further comprising:
    generating polarized signals associated with the high frequency multi spatial stream signals by rotating horizontally polarized signals to different degrees of polarization.

3. The method of claim 1, further comprising:
    generating polarized signals associated with the high frequency multi spatial stream signals by using polarizer sheets at a transmit antenna array system.

4. The method of claim 1, further comprising:
    generating at least three polarized signals associated with the at least three high frequency multi spatial stream signals by using an orthomode transducer assembly that provides the polarized signals with the three different polarizations; and
    providing the polarized signals to the same reflector antenna.

5. The method of claim 1, wherein:
    a first polarized signal associated with a first of the high frequency multi spatial stream signals with a first polarization is transmitted via a first transmit antenna array,
    a second polarized signal associated with a second of the high frequency multi spatial stream signals with a second polarization is transmitted via a second transmit antenna array, and
    a third polarized signal associated with a third of the high frequency multi spatial stream signals with a third polarization is transmitted via a third transmit antenna array.

6. The method of claim 1, wherein the three different polarizations include a vertical polarization, a +45 degrees polarization, and a −45 degrees polarization.

7. The method of claim 1, wherein the three different polarizations include a vertical polarization, a +60 degrees polarization, and a −60 degrees polarization.

8. The method of claim 1, further comprising:
    transmitting the high frequency multi spatial stream signals with four different polarizations simultaneously.

9. The method of claim 1, wherein the multi spatial stream chipset is a MIMO access point WiFi IEEE 802.11 chipset.

10. A node in a wireless access system, the node comprising:
    a multi spatial stream chipset generating and decoding multi spatial stream signals, wherein the multi spatial stream chipset is a WiFi IEEE 802.11 chipset;
    an upconverter for upconverting the multi spatial stream signals from the multi-stream chipset into high frequency multi spatial stream signals in a 10 GHz to 300 GHz band;
    a downconverter for downconverting received polarized signals in the 10 GHz to 300 GHz band into the multi spatial stream signals decoded by the multi-stream chipset;
    a transmit antenna system for transmitting the high frequency multi spatial stream signals as polarized signals with at least three different polarizations; and
    a receive antenna system for receiving the received polarized signals with the three different polarizations from other nodes.

11. The node of claim 10, wherein the multi spatial stream chipset is a MIMO access point WiFi IEEE 802.11 chipset.

12. The node of claim 10, wherein the polarized signals are generated by rotating horizontally polarized signals to different degrees of polarization.

13. The node of claim 10, wherein the polarized signals are transmitted by using polarizer sheets at the transmit antenna system.

14. The node of claim 13, wherein the polarizer sheets are placed over antenna apertures associated with the transmit antenna system.

15. The node of claim 10, wherein the other polarized signals are received by using polarizer sheets at the receive antenna system.

16. The node of claim 10, further comprising:
    an orthomode transducer assembly that receives the high frequency signals from an upconverter and provides the polarized signals with the three different polarizations to the transmit antenna system, wherein the transmit antenna system is a reflector antenna.

17. The node of claim 10, wherein the transmit antenna system transmits the polarized signals with four different polarizations and the receive antenna system receives the other polarized signals with the four different polarizations.

18. A wireless node, the node comprising:
a multi spatial stream chipset for encoding information into and decoding information from multi spatial stream signals, wherein the multi spatial stream chipset is a WiFi IEEE 802.11 chipset;
an upconverter for upconverting the multi spatial stream signals to high frequency multi spatial stream signals in a 10 GHz to 300 GHz band;
a transmit antenna system for transmitting the high frequency multi spatial stream signals as polarized signals with three or more different polarizations simultaneously; and
an orthomode transducer that receives the high frequency multi spatial stream signals from the upconverter and provides the polarized signals with the three or more different polarizations to the transmit antenna system.

19. The node of claim 18, wherein the polarized signals are generated by rotating horizontally polarized signals to different degrees of polarization.

20. The node of claim 18, wherein the polarized signals are transmitted by using polarizer sheets at the transmit antenna system.

21. The node of claim 18, wherein the multi spatial stream chipset is a MIMO access point WiFi IEEE 802.11 chipset.

22. A wireless node, the node comprising:
a multi spatial stream chipset for encoding information into and decoding information from multi spatial stream signals, wherein the multi spatial stream chipset is a WiFi IEEE 802.11 chipset;
an upconverter is used to upconvert the multi spatial stream signals to a 10 GHz to 300 GHz band; and
a Cassegrain antenna including multiple feed and/or receive antennas for generate beams of different polarizations and tilt angles for the upconverted multi spatial stream signals.

* * * * *